No. 672,307. Patented Apr. 16, 1901.
M. E. BONTE.
MEAT TENDERER.
(Application filed Apr. 5, 1900.)
(No Model.)
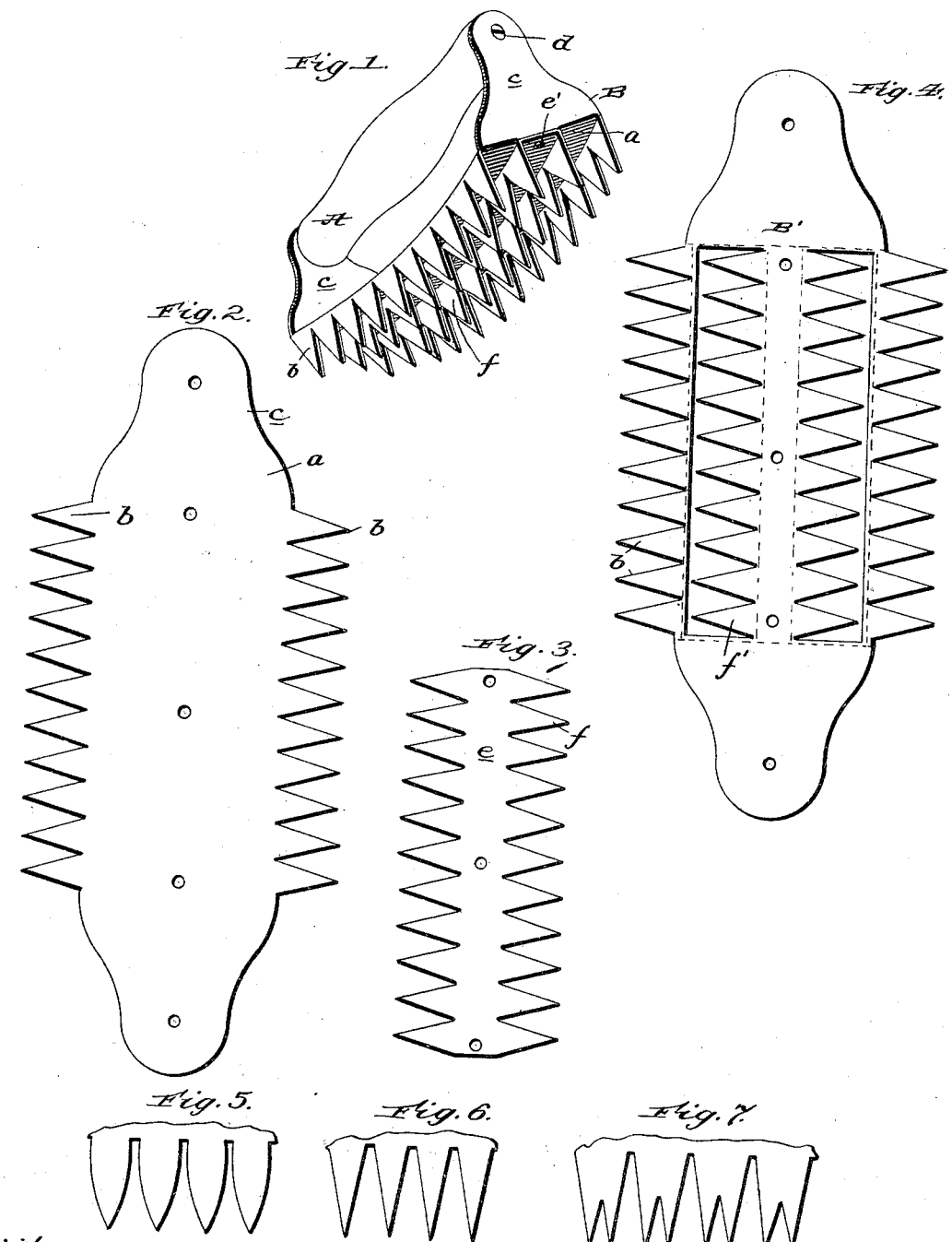

UNITED STATES PATENT OFFICE.

MARY E. BONTE, OF NEW YORK, N. Y.

MEAT-TENDERER.

SPECIFICATION forming part of Letters Patent No. 672,307, dated April 16, 1901.

Application filed April 5, 1900. Serial No. 11,687. (No model.)

*To all whom it may concern:*

Be it known that I, MARY E. BONTE, a citizen of the United States, residing at New York, in the county of New York and State of New York, have invented new and useful Improvements in Meat-Tenderers, of which the following is a specification.

My invention relates to meat-tenderers; and it consists in the simple, inexpensive, and highly-efficient construction hereinafter described, and particularly pointed out in the claims appended.

In the accompanying drawings, Figure 1 is a perspective view of my improved tenderer. Figs. 2 and 3 are plan views of the sheet-metal parts of which the body of the tenderer is formed. Fig. 4 is a plan view of a modified sheet-metal part of which the body of the tenderer may be formed. Figs. 5, 6, and 7 are detail views illustrating different forms of teeth with which the tenderer-body may be provided.

Referring by letter to the said drawings, and more particularly to Figs. 1 to 3 thereof, A is the handle of my improved tenderer, which is preferably made of wood in the shape shown, and B is the body of the tenderer, which, as shown in Figs. 1 to 3, is made in two parts, of sheet-steel or other suitable sheet metal. The main part $a$ of the tenderer, which is shown in Fig. 2, is cut by a die or other suitable means from a piece of sheet metal and is provided at its longitudinal edges with two rows of teeth $b$ and at its ends with arms $c$. The teeth $b$ are designed to be bent down at right angles to the face of the part, as shown in Fig. 1, while the arms $c$ are designed to be bent up at right angles and receive between them the handle A, to the ends of which they are connected by screws $d$ or other suitable means.

The handle A is slightly shorter than the main part $a$ of body B, and hence when the arms $c$ of the body are connected to the ends of the handle the said main part $a$ is slightly bent lengthwise into concavo-convex form, as shown in Fig. 1, so as to adapt the tenderer in practice to be conveniently rocked. The part $e$ of body B is also cut by a die from a piece of sheet-steel and is of the shape and proportional size shown. It is designed to be arranged below and connected by screws or rivets $e'$ to the main part $a$, at the longitudinal center thereof, and is provided at its longitudinal edges with teeth $f$, which are bent down at right angles to its face, as illustrated.

In lieu of a body B formed in two parts a one-part body B′, such as shown in Fig. 4, may be employed. This body B′ is similar to the part $a$ of body B, with the exception that it is provided at opposite sides of its longitudinal center with two auxiliary longitudinal rows of teeth $f'$, which, like the teeth $b$, are designed to be bent down into positions at right angles to its face.

The teeth on the body of my improved tenderer may be of the shape shown in Figs. 1 to 4 or of any one of the shapes shown in Figs. 5 to 7. All of these several forms of teeth are wider at their upper than at their lower ends, and hence it will be seen that when they are forced into a piece of meat by pressure applied to the handle A they will make cuts in the meat which are longer or wider at their upper than at their lower ends. In consequence of this when the tenderer is raised from the meat the teeth have ample space to rise in, and no meat will cling to them, which is an important advantage and a desideratum in this class of devices.

In using my improved device the operator grasps the handle A and presses the device against and rocks it upon a piece of meat. In this way the operator is enabled to quickly and easily render a large piece of meat very tender, and this without making any noise or in any way damaging the table or other surface on which the meat is placed.

It will be appreciated from the foregoing that by virtue of their bodies being cut by dies from sheet metal both embodiments of my invention are very simple and inexpensive and yet highly efficient for the purpose stated. It will also be appreciated that when the body of the device is formed of sheet-steel or equivalent material and is bent lengthwise into the concavo-convex form shown and described it is, by reason of its concavo-convex form and the resiliency of the sheet-steel or equivalent sheet metal, calculated to give while being used, which renders its operation very easy, and also calculated to spring away and disengage its teeth from the piece of meat being operated on as it is rocked to carry the teeth in a direction away from the piece of meat.

Having thus described my invention, what I claim is—

1. As an improved article of manufacture, the meat-tenderer, described, comprising the handle, and the resilient or springy sheet-metal body, of greater length than the handle, curved in the direction of its length so as to present a convex face to the meat, and having upwardly-bent arms at its ends, connected to the ends of the handle, and also having longitudinal rows of downwardly-bent teeth, substantially as specified.

2. As an improved article of manufacture, the herein-described meat-tenderer, comprising the handle and the resilient or springy body, of greater length than the handle, the said body being formed in one piece of sheet metal, and curved in the direction of its length so as to present a convex face to the meat, and being provided with upwardly-bent arms at its ends, connected to the ends of the handle, and also provided with the two outer and two inner longitudinal rows of downwardly-bent teeth, substantially as and for the purpose set forth.

In testimony whereof I have hereunto set my hand in presence of two subscribing witnesses.

MARY E. BONTE.

Witnesses:
  ALEX. R. HUTCHISON,
  HELEN H. CHENEY.